(12) United States Patent
Parkvall et al.

(10) Patent No.: US 12,101,778 B2
(45) Date of Patent: Sep. 24, 2024

(54) DOWNLINK CONTROL INFORMATION IN USS

(71) Applicant: Telefonaktiebolaget LM Ericsson (publ), Stockholm (SE)

(72) Inventors: Stefan Parkvall, Bromma (SE); Jianwei Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 588 days.

(21) Appl. No.: 17/279,695

(22) PCT Filed: Sep. 25, 2019

(86) PCT No.: PCT/EP2019/075952
§ 371 (c)(1),
(2) Date: Mar. 25, 2021

(87) PCT Pub. No.: WO2020/064889
PCT Pub. Date: Apr. 2, 2020

(65) Prior Publication Data
US 2021/0400702 A1     Dec. 23, 2021

Related U.S. Application Data

(60) Provisional application No. 62/736,500, filed on Sep. 26, 2018.

(51) Int. Cl.
| | | |
|---|---|---|
| *H04W 72/23* | (2023.01) | |
| *H04L 1/00* | (2006.01) | |
| *H04W 24/08* | (2009.01) | |

(52) U.S. Cl.
CPC ........... *H04W 72/23* (2023.01); *H04L 1/0004* (2013.01); *H04L 1/0008* (2013.01); *H04L 1/0038* (2013.01); *H04W 24/08* (2013.01)

(58) Field of Classification Search
None
See application file for complete search history.

(56) References Cited

U.S. PATENT DOCUMENTS 9,749,991 B2 *   8/2017  Guo ..................... H04W 72/21
10,009,919 B2    6/2018  Moulsley et al.
(Continued)

FOREIGN PATENT DOCUMENTS

| CN | 102461053 A | 5/2012 |
|---|---|---|
| CN | 103733711 A | 4/2014 |
| WO | 2010050784 A2 | 5/2010 |

OTHER PUBLICATIONS

3rd Generation Partnership Project, "3rd Generation Partnership Project; Technical Specification Group Radio Access Network; Study on New Radio (NR) Access Technology; Physical Layer Aspects (Release 14)", Technical Specification, 3GPP TR 38.802 V0.3.0, Oct. 1, 2016, pp. 1-43, 3GPP.

(Continued)

*Primary Examiner* — Liem H. Nguyen
(74) *Attorney, Agent, or Firm* — COATS & BENNETT, PLLC

(57) ABSTRACT

According to an aspect, a wireless device receives a DCI configuration for a first set of DCI formats, each DCI of the first set of DCI formats having a same size measured as a number of bits. The wireless device receives a DCI configuration for a second set of DCI formats wherein the second set is different from the first set. The wireless device detects a first DCI from the first set of DCI formats and a second DCI from the second set of DCI formats based on the first DCI having a different size to the second DCI and the second DCI comprising at least one padding bit. According to another aspect a base station configures a wireless device with at least one DCI format from a first set of DCI formats wherein each DCI of the first set of DCI formats having a (Continued)

same size measured as a number of bits, and at least one DCI format from a second set of DCI formats wherein the second set is different from the first set and wherein the first DCI having a different size to the second DCI and the second DCI comprising at least one padding bit.

19 Claims, 16 Drawing Sheets

(56) References Cited

U.S. PATENT DOCUMENTS

| | | | | |
|---|---|---|---|---|
| 11,324,010 | B2 * | 5/2022 | Ma | H04L 5/0053 |
| 2010/0111107 | A1 | 5/2010 | Han et al. | |
| 2010/0331030 | A1 | 12/2010 | Nory et al. | |
| 2013/0051355 | A1 * | 2/2013 | Hong | H04L 5/001 370/329 |
| 2014/0177582 | A1 * | 6/2014 | Wu | H04L 5/0053 370/329 |
| 2016/0249337 | A1 * | 8/2016 | Liang | H04W 48/12 |
| 2019/0274032 | A1 * | 9/2019 | Chatterjee | H04L 5/00 |
| 2019/0342907 | A1 * | 11/2019 | Huang | H04W 72/23 |
| 2019/0349180 | A1 * | 11/2019 | Lu | H04L 27/2607 |
| 2019/0394760 | A1 * | 12/2019 | Hwang | H04L 5/003 |
| 2020/0100219 | A1 * | 3/2020 | Takeda | H04W 72/23 |
| 2021/0067267 | A1 * | 3/2021 | Chen | H04L 1/0027 |
| 2021/0185718 | A1 * | 6/2021 | Ying | H04W 72/23 |
| 2021/0204308 | A1 * | 7/2021 | Takeda | H04W 72/1273 |
| 2021/0243767 | A1 * | 8/2021 | Suzuki | H04L 5/0007 |
| 2021/0392531 | A1 * | 12/2021 | Lu | H04W 52/146 |
| 2023/0025637 | A1 * | 1/2023 | He | H04L 5/0094 |

OTHER PUBLICATIONS

3rd Generation Partnership Project, "3rd Generation Partnership Project; Technical Specification Group Radio Access Network; NR; Multiplexing and Channel Coding (Release 15)", Technical Specification, 3GPP TS 38.212 V15.3.0, Sep. 1, 2018, pp. 1-99, 3GPP.

Samsung, "DCI Contents and Formats", 3GPP TSG RAN WG1 Meeting 91, Reno, USA, Nov. 27, 2017, pp. 1-4, R1-1720322, 3GPP.

Mediatek Inc., "Discussion on DCI Formats", 3GPP TSG RAN WG1 Meeting #90bis, Prague, CZ, Oct. 9, 2017, pp. 1-4, R1-1718325, 3GPP.

NEC Group et al., "Padding One Bit to DCI Format 1 When Fomat 1 and Fomat 0/1A Have the Same Size", 3GPP TSG-RAN1 Meeting #53bis, Warsaw, Poland, Jun. 30, 2008, pp. 1-2, R1-082709, 3GPP.

Ericsson, "Summary of 7.1.3.1 (DCI contents and formats)", TSG-RAN WG1 #94bis, Chengdu, China, Oct. 8-12, 2018, pp. 1-17, R1-1812066, 3GPP.

Qualcomm Incorporated, "Maintenance for Physical Downlink Control Channel", 3GPP TSG RAN WG1 Meeting #95, Spokane, Washington, USA, Nov. 12-Oct. 16, 2018, pp. 1-5, R1-1813399, 3GPP.

NEC Group, et al., "Padding one bit to DCI format 1 when fomat 1 and fomat 0/1A have the same size", Change Request, 3GPP TSG-RAN1 Meeting #53bis, Warsaw, Poland, Jun. 30-Jul. 4, 2008, pp. 1-2, R1-082709, 3GPP.

* cited by examiner

DOWNLINK CONTROL INFORMATION IN USS

TECHNICAL FIELD

Embodiments herein relate generally to a base station and a method in the base station, and to a User Equipment (UE) and a method in the user equipment. More particularly the embodiments herein relate to downlink control information in user equipment-specific search space (USS).

BACKGROUND

Wireless communication networks, including network nodes and radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

5G is not yet fully defined, but in an advanced draft stage within the Third Generation Partnership Project (3GPP). 5G wireless access will be realized by the evolution of Long Term Evolution (LTE) for existing spectrum, in combination with new radio access technologies that primarily target new spectrum. Thus, it includes work on a 5G New Radio (NR) Access Technology, also known as next generation (NX). The NR air interface targets spectrum in the range from below 1 GHz up to 100 GHz, with initial deployments expected in frequency bands not utilized by LTE. Some LTE terminology may be used in this disclosure in a forward-looking sense, to include equivalent 5G entities or functionalities, although a different term is or may eventually be specified in 5G. A general description of the agreements on 5G NR Access Technology so far is contained in 3GPP TR 38.802 V0.3.0 (2016 October), of which a draft version has been published as R1-1610848.

Downlink control information (DCI) is used in NR to, among other things, transmit scheduling decisions from the gNB to the UE. Different DCI formats are defined for different purposes, differing in e.g. the information carried in the DCI.

The number of bits in the DCI (i.e. the DCI size), as well as the division of the bits between different information fields in the DCI, can either be fixed or depend on higher-layer configuration.

To indicate the UE which is being addressed by the DCI (and sometimes the purpose of the DCI) an identity (radio network temporary identity, RNTI) is included in the cyclic redundancy check (CRC) of the DCI transmitted.

The UE blindly attempts to decode DCI messages using the RNTIs the UE is supposed to monitor. If the CRC result is valid, the DCI is correctly received and intended of this UE and it follows the content of the DCI. If the CRC is not valid either the DCI was received in error or was intended for another UE and in either case the UE ignores it. Blindly detecting the DCI is done according to search spaces which can be configured in the UE.

Depending on the DCI configuration there can be some DCI format configurations such that a UE cannot reliably perform blind detection.

SUMMARY

One or more embodiments herein provide solutions to differentiate the DCI formats to enable reliable blind detection, for example in User Specific Search Spaces.

In a first aspect, a method performed by a wireless device is provided. The method comprising receiving a DCI configuration for a first set of DCI formats wherein each DCI of the first set of DCI formats having a same size measured as a number of bit, receiving a DCI configuration for a second set of DCI formats wherein the second set is different from the first set. The method also comprises detecting a first DCI from the first set of DCI formats and a second DCI from the second set of DCI formats based on the first DCI having a different size to the second DCI and the second DCI format comprising at least one padding bit.

In some examples of the first aspect, the first set of DCI formats comprises the formats: "0_0" and "1_0" and the second set of DCI formats comprises the formats: "0_1" and "1_1".

In further examples of the first aspect, the DCIs are monitored in multiple search spaces and the first DCI from the first set of DCIs is detected in a first UE-specific search space and the second DCI from the second set of DCI formats is detected in a second UE-specific search space.

In another example of the first aspect, the method further comprises the wireless device determining whether the DCI is in the first or second set based on the size and determining the DCI format within the determined set based on a format indicator bit in the DCI.

In another example of the first aspect, the wireless device is not expected to handle configurations resulting in a DCI from the second set of DCI formats having the same size as a DCI from the first set of DCI formats when the scheduling direction for each of the DCI formats is the same, for example the DCI format for the first set is "0_0" and the DCI format from the second set is "0_1" or the DCI format for the first set is "1_0" and the DCI from the second set is 37 1_1.

In a second aspect, a method, performed by a base station for transmitting Downlink Control Information, DCI, to one or more wireless devices, in user equipment, UE, specific search spaces is provided. The method comprising configuring a wireless device with at least one DCI format from a first set of DCI formats wherein each DCI of the first set of DCI formats having a same size measured as a number of bits; and at least one DCI format from a second set of DCI formats wherein the second set is different from the first set and wherein the first DCI from the first set of DCI formats having a different size to the second DCI from the second set of DCI formats and the second DCI comprising at least one padding bit.

In some example of the second aspect, the method further comprises determining a second DCI for scheduling in a UE-specific search space from the second set of DCI formats and if the selected first DCI and the selected second DCI are the same length in bits, padding the second DCI by at least one bit. The method includes transmitting the first and second DCI to the wireless device.

In some examples of the second aspect the first set of DCI formats comprises the formats: "0_0" and "1_0"; and the second set of DCI formats comprises the formats: "0_1" and "1_1".

In a third aspect, a wireless device for receiving Downlink Control Information, DCI, in user equipment, UE, specific search spaces is provided. The wireless device is configured to receive a DCI configuration for at least one of a first set of DCI formats wherein each DCI of the first set of DCI formats having a same size measured as a number of bits and to receive a DCI configuration for at least one of a second set of DCI formats wherein the second set is different from the first set. The wireless device is also configured to detect a first DCI from the first set of DCI formats and a second DCI from the second set of DCI formats based on the first DCI having a different size to the second DCI and the second DCI format comprising at least one padding bit.

In some examples of the third aspect, the first set of DCI formats comprises the formats: "0_0" and "1_0"; and the second set of DCI formats comprises the formats: "0_1" and "1_1".

In some examples of the third aspect, the DCIs are monitored in multiple search spaces and the wireless device is configured to detect the first DCI from the first set of DCI formats in a first UE-specific search space and detect the second DCI from the second set of DCI formats in a second UE-specific search space.

In some examples of the third aspect, the wireless device is configured to not expect to handle configurations resulting in a DCI from the second set of DCI formats having the same size as a DCI from the first set of DCI formats when the scheduling direction for each of the DCI formats is the same, for example the DCI format for the first set is "0_0" and the DCI format from the second set is "0_1" or the DCI format for the first set is "1_0" and the DCI from the second set is "1_1".

In a fourth aspect, base station for transmitting Downlink Control Information, DCI, to one or more wireless devices, in user equipment, UE, specific search spaces is provided. The base station is configured to configure a wireless device with at least one DCI format from a first set of DCI formats wherein each DCI of the first set of DCI formats having a same size measured as a number of bits; and at least one DCI format from a second set of DCI formats wherein the second set is different from the first set and wherein the first DCI having a different size to the second DCI and the second DCI comprising at least one padding bit.

In some examples of the fourth aspect, the base station is further configured to determine a first DCI for scheduling in a UE-specific search space from the first set of DCI formats and determine a second DCI for scheduling in a UE-specific search space from the second set of DCI formats and if the selected first DCI and the selected second DCI are the same length in bits, pad the second DCI by at least one bit. The base station is also configured to transmit the first and second DCI to the wireless device.

In some examples of the fourth aspect the first set of DCI formats comprises the formats: "0_0" and "1_0"; and the second set of DCI formats comprises the formats: "0_1" and "1_1".

In a fifth aspect, a computer program comprising instructions is provided. The computer program, when executed by at least one processor of a wireless device, causes the wireless device to carry out the wireless device methods described above.

In a sixth aspect a computer program comprising instructions is the provided. The computer program, when executed by at least one processor of a base station causes the base station to carry out any of the base station methods described above.

In a seventh aspect a carrier containing the computer program of either the fifth or the sixth aspect is provided. The carrier is one of an electronic signal, optical signal, radio signal, or computer readable storage medium.

One advantage of one or more of the above aspects provides efficient DCI signaling and configuration allowing blind detection of the DCI format, as opposed to requiring additional DCI fields to explicitly distinguish each DCI format for all possible UE configurations.

DETAILED DESCRIPTION

Figure 1:
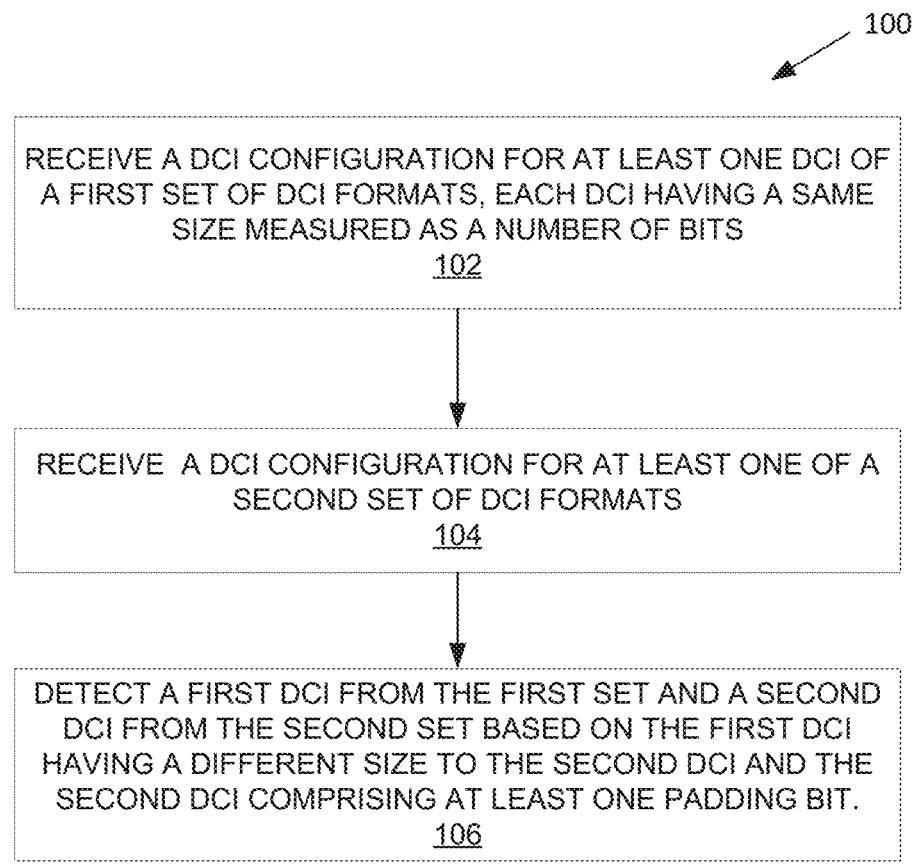
FIG. 1 is a flow diagram illustrating an exemplary method according one or more embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Downlink control information (DCI) used in NR to, among other things, transmit scheduling decisions from the gNB to the UE include:
- formats 0-0 and 0-1 for uplink scheduling, and
- formats 1-0 and 1-1 for downlink scheduling.

In general, formats 0-0 and 1-0 are fixed in size while the size of formats 0-1 and 1-1 depend on higher-layer configuration (for example Multiple-Input-Multiple-Output, MIMO, mode).

The size of DCI formats 0-0 and 1-0 are always aligned while formats 0-1 and 1-1 can have different sizes, both mutually as well as compared to 0-0/1-0 formats. All of the DCI formats include a format indicator bit in the DCI indicating whether it is related to uplink or downlink, thus allowing the UE to differentiate between 0-0 and 1-0 despite the two formats having the same size (and similarly for 0-1 and 1-1 in case they have the same size).

To indicate the UE which is being addressed multiple RNTIs may be defined. For example:
- C-RNTI, CS-RNTI, and MCS-C-RNTI intended to address a single UE for uplink or downlink scheduling purposes,
- P-RNTI for paging messages addressing multiple UEs,
- RA-RNTI for random-access response (possibly addressing multiple UEs), and
- SI-RNTI for scheduling system information to multiple UEs The UE blindly attempts to decode DCI messages using the RNTIs the UE is supposed to monitor. Blindly detecting the DCI is done according to search spaces which can be configured in the UE. Search spaces can be either common search spaces (CSS) or UE-specific search spaces (USS). Not all RNTIs are allowed in all search spaces. For example:
- P-RNTI/RA_RNTI and SI-RNTI, which all use DCI format 1-0, are only allowed in CSS
- C-RNTI/CS-RNTI/MCS-C-RNTI using DCI formats 0-0 or 1-0 are allowed in either CSS or USS.
- C-RNTI/CS-RNTI/MCS-C-RNTI using DCI formats 0-1 or 1-1 are allowed in USS only A UE can differentiate different DCI formats (and hence how to interpret the bits in the DCI) by using one or more of:
- the DCI size,
- the search space the DCI was detected in,
- the RNTI, and
- the format indicator bit.

Some embodiments, provided herein, facilitate blind detection of DCI formats. In some instances, blind detection may not be reliable, for example, if the (higher-layer) configuration is such that it is not possible for the UE to determine the DCI format and how to interpret the bits, resulting in undefined UE behavior. There is therefore a need of a method allowing the UE to differentiate the DCI formats regardless of the UE configuration.

Certain aspects of the present disclosure and their embodiments may provide solutions to differentiate the DCI formats regardless of the UE configuration. For example, if the DCI size of 0-1 (or 1-1) result in the same DCI size as 0-0/1-0 in USS, add padding to ensure the size of 0-1 (or 1-1) differs from 0-0/1-0. One advantage of one or more embodiments provides efficient DCI signaling and configuration allowing blind detection of the DCI format, as opposed to requiring additional DCI fields to explicitly distinguish each DCI format for all possible UE configurations.

In view of the embodiments above, the present disclosure generally includes the following embodiments, e.g., which may address one or more of the issues disclosed herein.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. In particular, a network node may be comprised in a non-terrestrial network as part of a wireless communications system. A non-terrestrial network (NTN) comprises communications satellites and network nodes. The network nodes may be terrestrial or satellite based. For example the network node may be a satellite gateway or a satellite based base station, e.g. gNB. Other examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In particular the wireless device may be involved in communication with a non-terrestrial network nodes, such as communications satellites and satellite based gateways or base stations. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

One option to enable a wireless device/UE to differentiate between DCI formats in USS would be to extend the DCI header from a single UL/DL bit to a multi-bit field indicating also the DCI format.

FIG. 1 depicts a method, performed by a wireless device for receiving Downlink Control Information, DCI, in UE-specific search spaces. The method 100 involves the wireless device receiving 102 a DCI configuration for a first set of DCI formats, wherein each DCI of the first set of DCI formats have the same size measured as a number of bits. The wireless device also receives 104 a DCI configuration for a second set of DCI formats wherein the second set is different from the first set. For example, the wireless device is configured to monitor at least one DCI from the first set and at least one DCI from the second set. The method proceeds with detecting 106 a first DCI from the first set and a second DCI from the second set based on the first DCI having a different size to the second DCI and the second DCI comprising at least one padding bit. In other words, the wireless device performs blind detection and detects a first and a second DCI which have different sizes due to the second DCI being padded with at least one bit since it would otherwise have been the same length.

In some examples the first set of DCI formats comprises the formats: "0_0" and "1_0" which as described above are always aligned and include a format indicator bit to indicate uplink and downlink respectively. In some examples the second set of DCI formats comprises the formats: "0_1" and "1_1" which can have different sizes and represent DCI for uplink and downlink respectively.

As described above, the wireless device performs blind detection according to search spaces configured in the wireless device and which can be common search spaces or UE-specific search spaces. Thus, in some examples the DCI formats are monitored in multiple search spaces and the first DCI format from the first set may be detected in a first UE-specific search space and the second DCI format from the second set may be detected in a second UE-specific search space.

In some examples detecting the first and the second DCI comprises blindly decoding a potential DCI using predetermined Radio Network Temporary Identifiers (RNTI). The predetermined RNTI may include at least one of: Cell RNTI (C-RNTI), Configure Scheduling RNTI (CS-RNTI), and Modulation and Coding Scheme C-RNTI (MCS-C-RNTI).

The method 100 may further comprise determining whether the DCI is in the first or second set based on the size and determining the DCI format within the determined set based on a format indicator bit in the DCI.

The DCI configuration for the first set of DCI formats and/or the second set of DCI formats may be received via RRC signalling.

In some embodiments the wireless device should not be not expected to handle configurations resulting in a DCI from the second set of DCI formats having the same size as a DCI from the first set of DCI formats when the scheduling direction for each of the DCI formats is the same, for example when the DCI format for the first set is "0_0" and the DCI format from the second set is "0_1" or when the DCI format for the first set is "1_0" and the DCI from the second set is "1_1". In some examples this may be stated in the specifications that the UE is not expected to handle configurations resulting in DCI format 0-1 having the same size as 0-0/1-0 in USS (and the same for format 1-1).

Figure 2:
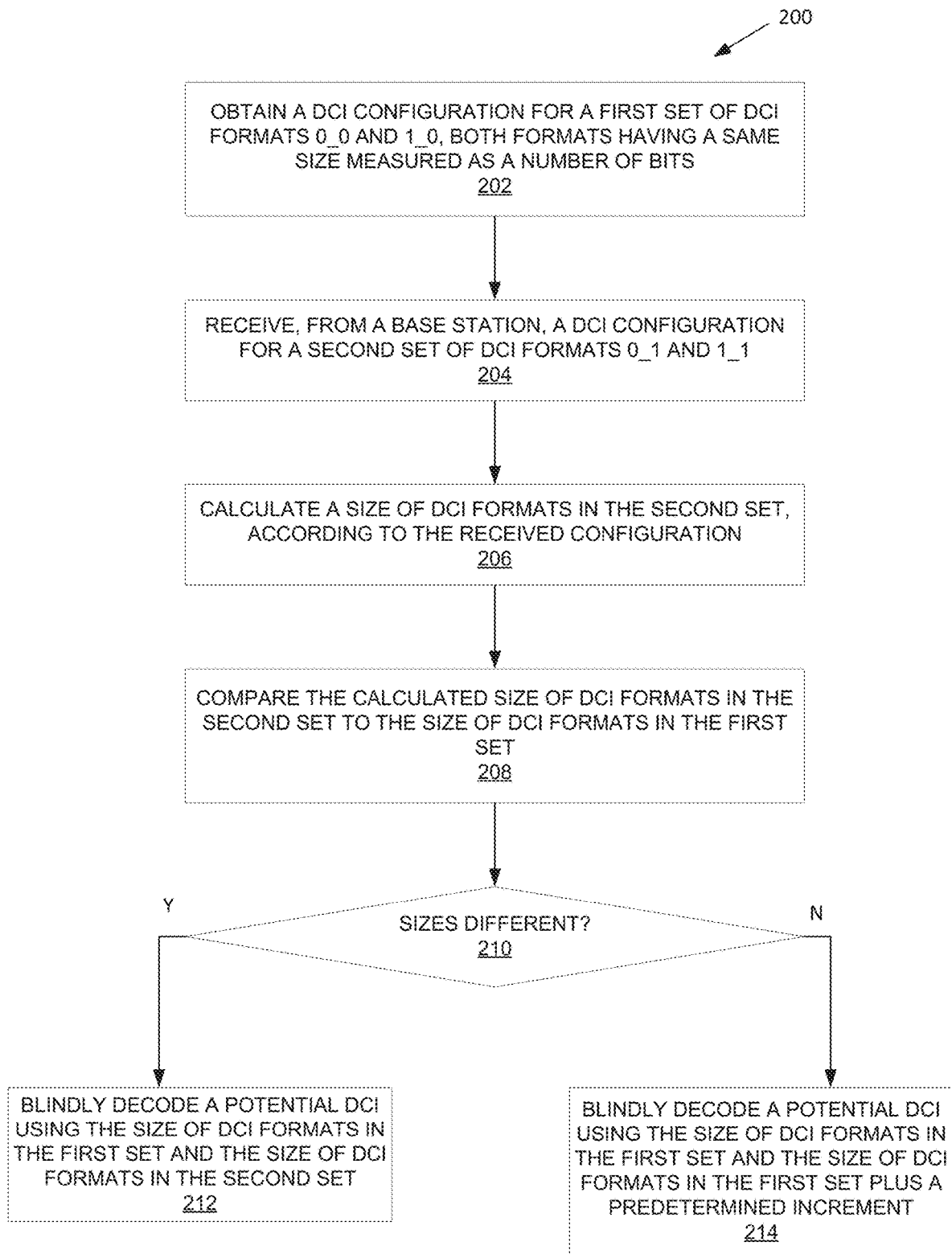
FIG. 2 is a flow diagram illustrating another exemplary method according one or more embodiments of the present disclosure.

FIG. 2 depicts a method 200, in accordance with particular embodiments. The method 200 is performed by a wireless device operative in a wireless communication network. The method 200 is for receiving Downlink Control Information (DCI) and determining the DCI format in response to a size of the DCI. A DCI configuration for a first set of DCI formats, the set comprising 0_0 and 1_0 is obtained (block 202). Both formats in the first set have a same size, measured as a number of bits. A DCI configuration for a second set of DCI formats, the set comprising 0_1 and 1_1 is received from a base station (block 104). A size of DCI formats in the second set is calculated according to the received configuration (block 206). The calculated size of DCI formats in the second set is compared to the size of DCI formats in the first set (block 208). If the sizes are different (block 210), a potential DCI is blindly decoded using the size of DCI formats in the first set and the size of DCI formats in the second set (block 212). If the sizes are equal, a potential DCI is blindly decoded using the size of DCI formats in the first set and the size of DCI formats in the first set plus a predetermined increment (block 214).

Figure 3:
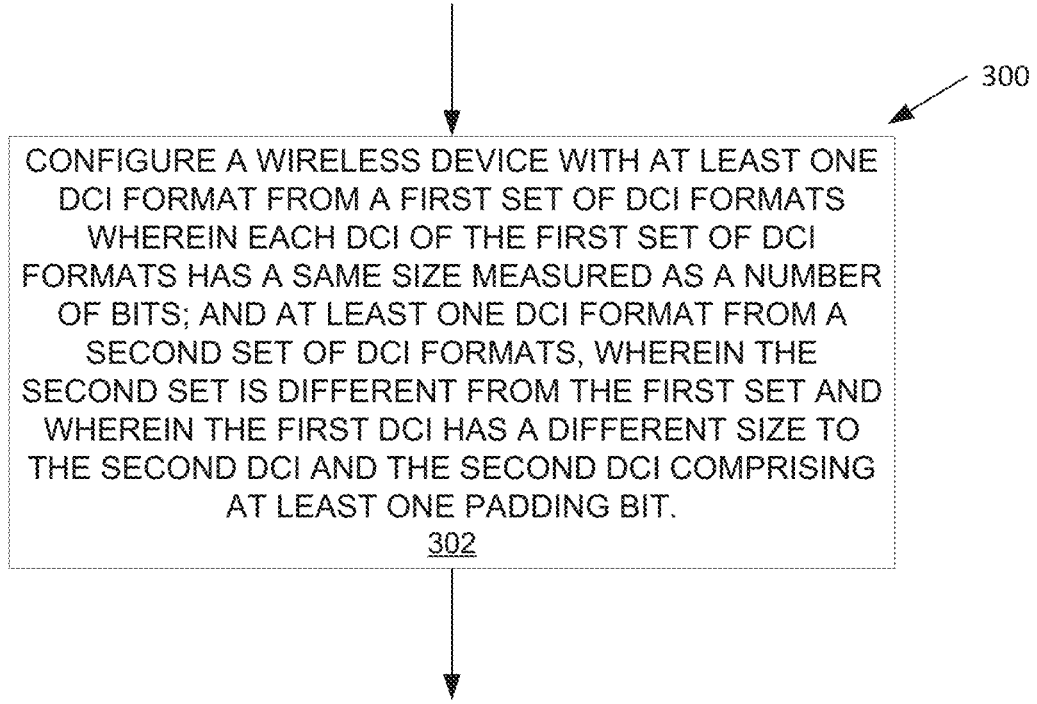
FIG. 3 is a flow diagram illustrating another exemplary method according one or more embodiments of the present disclosure.

FIG. 3 depicts a method 300, performed by a base station for transmitting Downlink Control Information, DCI, to one or more wireless devices, in UE-specific search spaces. The method 300 comprising the step of configuring 302 a wireless device with at least one DCI format from a first set of DCI formats, each DCI of the first set of DCI formats having a same size measured as a number of bits, and at least one DCI format from a second set of DCI formats. The second set of DCI formats is different from the first set. The first DCI having a different size to the second DCI and the second DCI comprising at least one padding bit.

When the at least one second DCI format would have the same size as the first DCI formats then at least one padding bit is added to ensure the at least one second DCI format has a different size to the at least one first DCI format. For example, the base station may be configured to add padding to DCI format 0-1 if needed to ensure the size differs from 0-0/1-0 in USS (same for format 1-1). Note: DCI formats 0-1 and 1-1 can only be used in USS (at least in the current NR specification), hence the 'in USS' above. If DCI formats 0-1 and/or 1-1 in USS have the same size as 0-0/1-0 in CSS this does not matter as the UE in that case can differentiate the DCI formats based on the search space in which they were found.

In some examples the method 300 may further comprise determining a first DCI for scheduling in a UE-specific search space from the first set of DCI formats and determining a second DCI for scheduling in a UE-specific search space from the second set of DCI formats and if the selected first DCI and the selected second DCI are the same length in bits, padding the second DCI by at least one bit and transmitting the first and second DCI to the wireless device.

In some examples of the method 300 the first set of DCI formats comprise the formats: "0_0" and "1_0"; and wherein the second set of DCI formats comprises the formats: "0_1" and "1_1".

In some examples the method 300 comprises the second set of DCI formats are a non-fallback format. The number of bits in the second DCI are compared to a predetermined number of bits and if the number of bits in the non-fallback format, for example 0_1 or 1_1 DCI equals the predetermined number either padding the non-fallback format (e.g. 0_1 or 1_1) DCI by at least one bit and transmitting the padded non-fallback format DCI or suppressing transmission of the non-fallback format DCI.

In further examples the DCI formats may be scheduled in multiple search spaces and the first DCI format from the first set is scheduled in a first UE-specific search space and the second DCI format from the second set is scheduled in a second UE-specific search space.

In some examples, transmitting the first and second DCI comprises scrambling a Cyclic Redundancy Code, CRC, using a Radio Network Temporary Identifier, RNTI, type selected from a predetermined set of RNTI types. The predetermined RNTI types may include Cell RNTI, C-RNTI, Configure Scheduling RNTI, CS-RNTI, and Modulation and Coding Scheme C-RNTI, MCS-C-RNTI.

Figure 4:
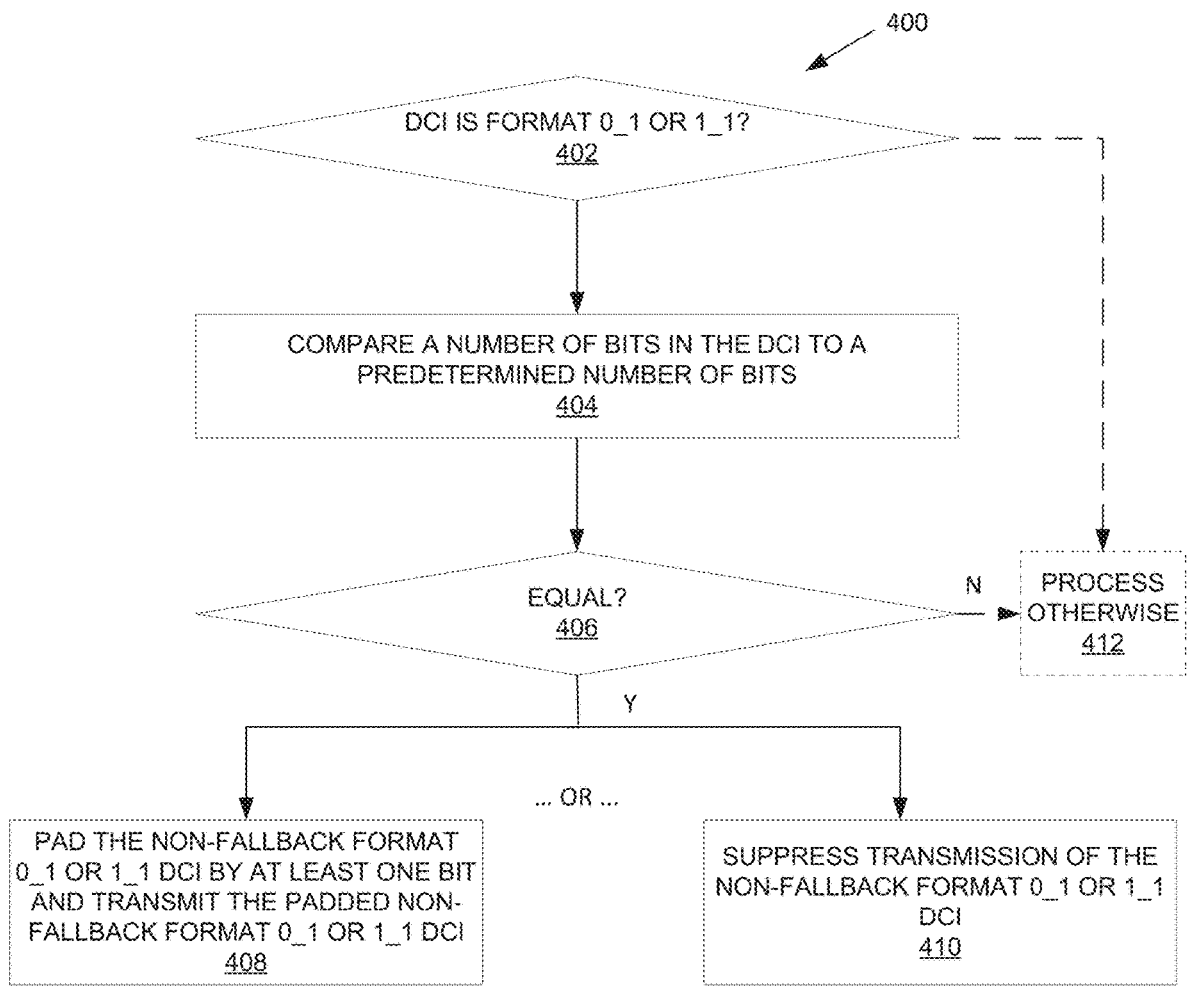
FIG. 4 is a flow diagram illustrating another exemplary method according one or more embodiments of the present disclosure.

FIG. 4 depicts a method 400 in accordance with other particular embodiments. The method 400 is performed by a base station operative in a wireless communication network. The method 400 is for transmitting Downlink Control Information (DCI) to one or more wireless devices. If the DCI is of a non-fallback format 0_1 or 1_1 (block 402), a number of bits in the DCI is compared to a predetermined number of bits (block 404). If the number of bits in the non-fallback format 0_1 or 1_1 DCI equals the predetermined number (block 406), then one of two paths is followed. Either the format 0_1 or 1_1 DCI is padded by at least one bit (block 408), and then transmitted (block 410), or transmission of the non-fallback format 0_1 or 1_1 DCI is suppressed. For completeness, if the DCI is of any format other than a non-fallback format 0_1 or 1_1 (at block 402), the method 400 is not invoked, and the DCI is processed otherwise (block 412). Similarly, if the number of bits in the non-fallback format 0_1 or 1_1 DCI does not equal the predetermined number (at block 406), then the DCI is processed normally (block 412).

Note that the apparatuses described herein may perform methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
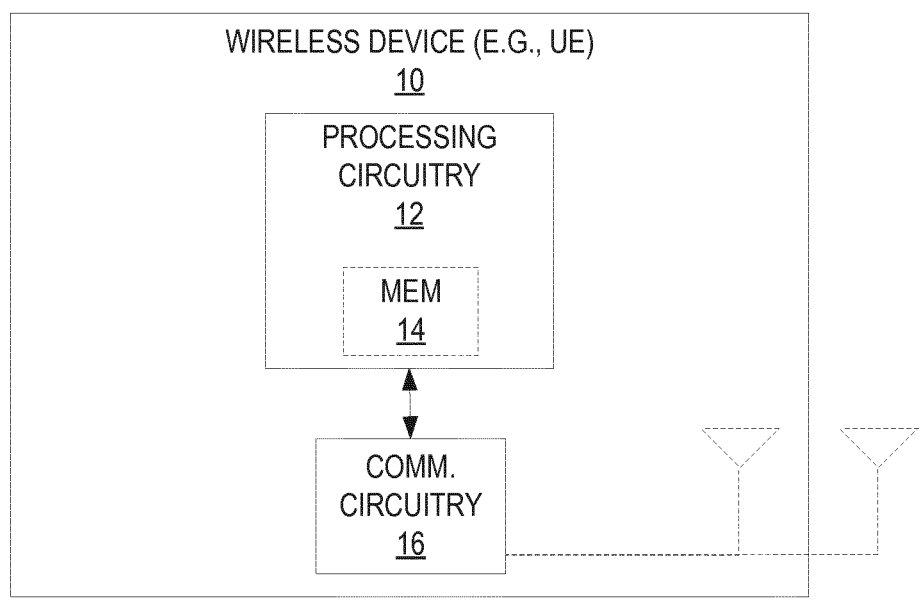
FIG. 5 illustrates a wireless device as implemented in accordance with one or more embodiments.

FIG. 5 for example illustrates a wireless device 10 as implemented in accordance with one or more embodiments. As shown, the wireless device 10 includes processing circuitry 12 and communication circuitry 16. The communication circuitry 16 (e.g., radio circuitry) is configured to transmit and/or receive information to and/or from one or more other nodes, e.g., via any communication technology. Such communication may occur via one or more antennas that are either internal or external to the wireless device 10. The processing circuitry 12 is configured to perform processing described above, such as by executing instructions stored in memory 14. The processing circuitry 12 in this regard may implement certain functional means, units, or modules.

In some embodiments the wireless device 10 is configured for receiving Downlink Control Information, DCI, in UE-specific search spaces, the wireless device 10 is configured to receive a DCI configuration for at least one DCI of a first set of DCI formats wherein each DCI of the first set of DCI formats having a same size measured as a number of bits and receive a DCI configuration for at least one DCI of a second set of DCI formats wherein the second set is different from the first set. The wireless device 10 is also configured to detect a first DCI from the first set and a second DCI from the second set based on the first DCI having a different size to the second DCI and the second DCI comprising at least one padding bit.

In some examples the first set of DCI formats comprises the formats: "0_0" and "1_0" and the second set of DCI formats comprises the formats: "0_1" and "1_1".

In some examples the wireless device 10 is configured to monitor the DCI formats in multiple search spaces and to detect the first DCI format from the first set in a first UE-specific search space and detect the second DCI format from the second set in a second UE-specific search space.

In some examples, detecting the first and the second DCI comprises blindly decoding a potential DCI using predetermined Radio Network Temporary Identifiers, RNTI. The predetermined RNTI may include at least one of: Cell RNTI, C-RNTI, Configure Scheduling RNTI, CS-RNTI, and Modulation and Coding Scheme C-RNTI, MCS-C-RNTI.

In some examples the wireless device 10 further configured to determine whether the DCI is in the first or second set based on the size and determine the DCI format within the determined set based on a format indicator bit in the DCI.

In some examples the wireless device 10 is configured to not expect to handle configurations resulting in a DCI from the second set of DCI formats having the same size as a DCI from the first set of DCI formats when the scheduling direction for each of the DCI formats is the same.

Figure 6:
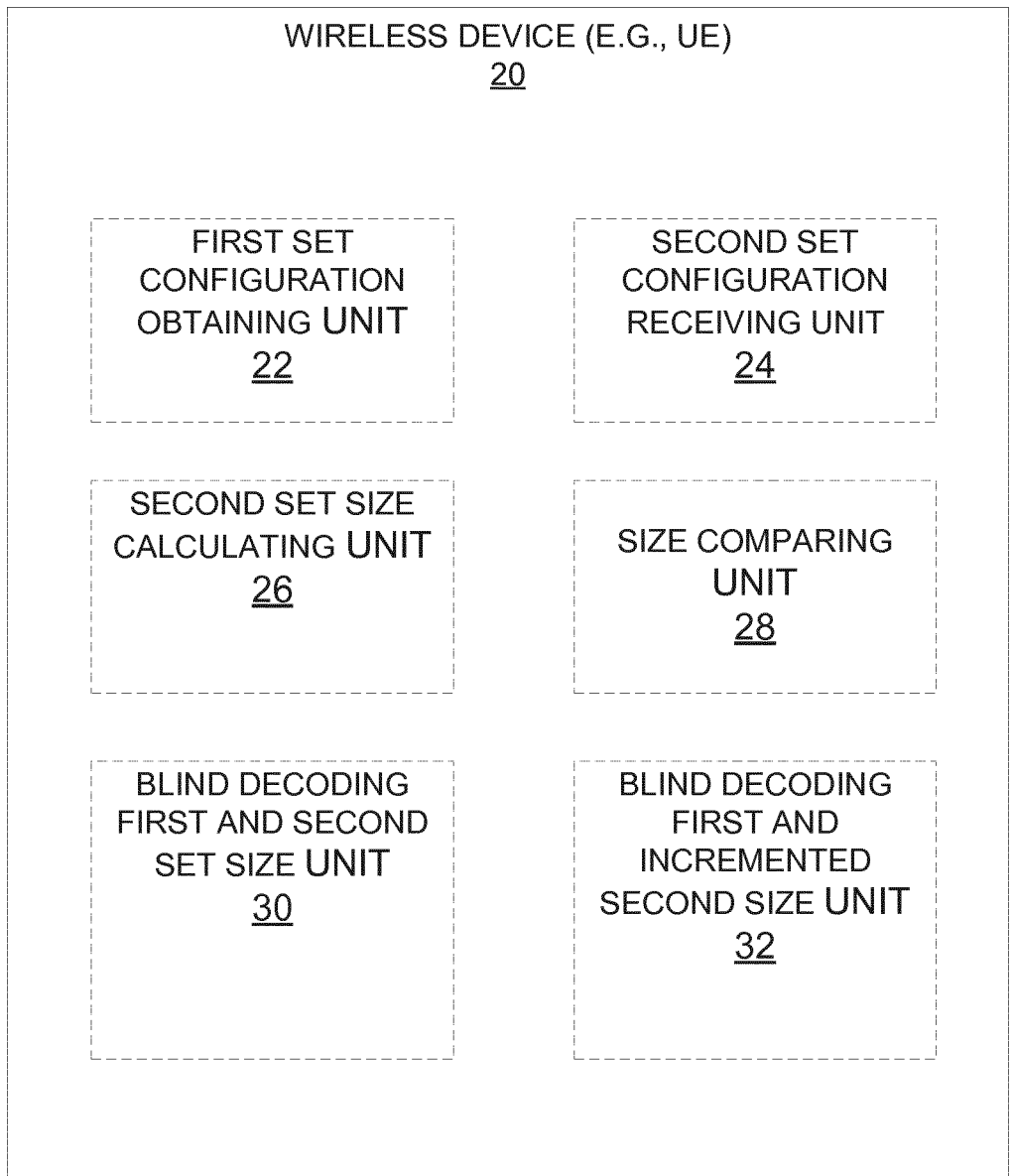
FIG. 6 illustrates a schematic block diagram of a wireless device 20 in a wireless network according to still other embodiments of the present disclosure.
Figure 9:
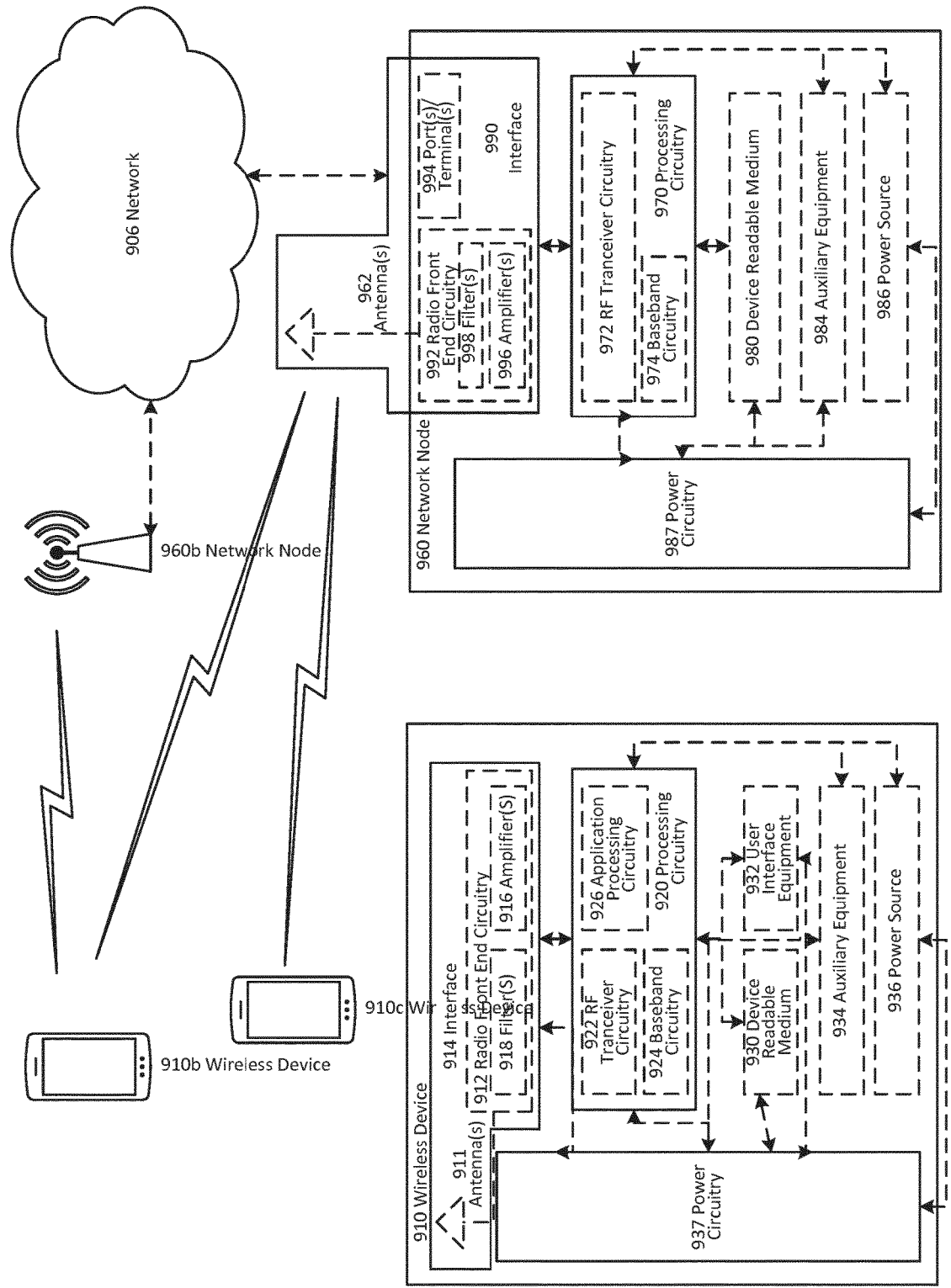
FIG. 9 is a block diagram illustrating an example network environment according to embodiments of the present disclosure.

FIG. 6 illustrates a schematic block diagram of a wireless device 20 in a wireless network according to still other embodiments (for example, the wireless network shown in FIG. 9). As shown, the wireless device 20 implements various functional means, units, or modules, e.g., via the processing circuitry 12 in FIG. 5 and/or via software code. These functional means, units, or modules, e.g., for implementing the method(s) herein, include for instance: first set configuration obtaining unit 22, second set configuration receiving unit 24, second set size calculating unit 26, size comparing unit 28, blind decoding first and second set size unit 30, and blind decoding first and incremented second size unit 32. First set configuration obtaining unit 22 is configured to obtain a DCI configuration for a first set of DCI formats, e.g. 0_0 and 1_0, both formats having a same size measured as a number of bits. Second set configuration receiving unit 24 is configured to receive, from a base station, a DCI configuration for a second set of DCI formats, e.g. 0_1 and 1_1. Second set size calculating unit 26 is configured to calculate a size of DCI formats in the second set, according to the received configuration. Size comparing unit 28 is configured to compare the calculated size of DCI formats in the second set to the size of DCI formats in the first set. Blind decoding first and second set size unit 30 is configured to, if the sizes are different, blindly decode a potential DCI using the size of DCI formats in the first set and the size of DCI formats in the second set. Blind decoding first and incremented second size unit 32 is configured to, if the sizes are equal, blindly decode a potential DCI using the size of DCI formats in the first set and the size of DCI formats in the first set plus a predetermined increment.

Figure 7:
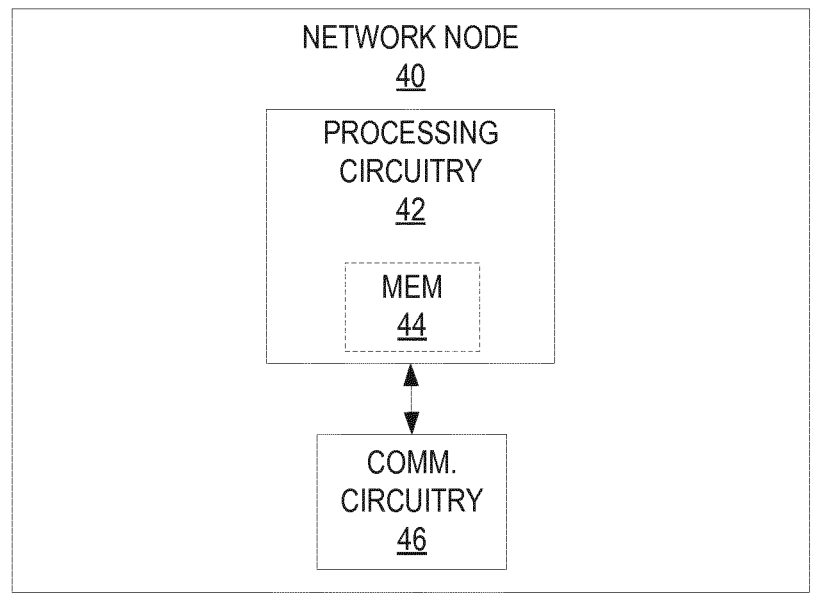
FIG. 7 illustrates a network node as implemented in accordance with one or more embodiments of the present disclosure.

FIG. 7 illustrates a network node 40 as implemented in accordance with one or more embodiments. As shown, the network node 40 includes processing circuitry 42 and communication circuitry 46. The communication circuitry 46 is configured to transmit and/or receive information to and/or from one or more other nodes, e.g., via any communication technology. The processing circuitry 42 is configured to perform processing described above, such as by executing instructions stored in memory 44. The processing circuitry 42 in this regard may implement certain functional means, units, or modules.

In some embodiments the network node 40 comprises a base station the base station configured to configure a wireless device with at least one DCI format from a first set of DCI formats, each DCI of the first set of DCI formats having a same size measured as a number of bits and at least one DCI format from a second set of DCI formats wherein the second set is different from the first set and wherein the first DCI having a different size to the second DCI and the second DCI comprising at least one padding bit.

In some examples the network node 40, e.g. base station, is further configured to determine a first DCI for scheduling in a UE-specific search space from the first set of DCI formats; and determine a second DCI for scheduling in a UE-specific search space from the second set of DCI formats and if the selected first DCI and the selected second DCI are the same length in bits, pad the second DCI by at least one bit and transmit the first and second DCI to the wireless device.

In some examples the first set of DCI formats comprises the formats: "0_0" and "1_0" and the second set of DCI formats comprises the formats: "0_1" and "1_1".

In some examples the network node 40, e.g. base station, is further configured to compare a number of bits in the second DCI to a predetermined number of bits and the second set of DCI formats is of a non-fallback format and, if the number of bits in the non-fallback format, (e.g. 0_1 or 1_1) DCI equals the predetermined number, either padding the non-fallback format DCI by at least one bit and transmitting the padded non-fallback format DCI or suppressing transmission of the non-fallback format 0_1 or 1_1 DCI.

In some examples the network node 40, e.g. base station, is configured to schedule the DCIs in multiple search spaces and the first DCI format from the first set is scheduled in a first UE-specific search space and the second DCI format from the second set is scheduled in a second UE-specific search space.

In some examples the network node 40, e.g. base station, is configured to ensure that configurations of a DCI from the second set of DCI formats are different in size to a DCI from the first set of DCI formats.

In some examples transmitting the first and second DCI comprises scrambling a Cyclic Redundancy Code (CRC) using a Radio Network Temporary Identifier (RNTI) type selected from a predetermined set of RNTI types. The predetermined RNTI types may include Cell RNTI (C-RNTI), Configure Scheduling RNTI (CS-RNTI), and Modulation and Coding Scheme C-RNTI (MCS-C-RNTI).

Figure 8:
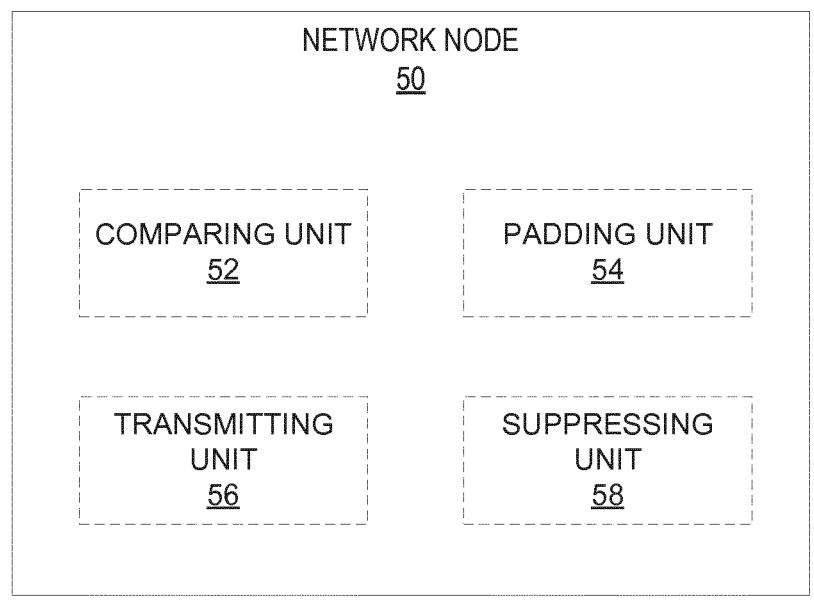
FIG. 8 illustrates a schematic block diagram of a network node in a wireless network according to still other embodiments of the present disclosure.

FIG. 8 illustrates a schematic block diagram of a network node 50 in a wireless network according to still other embodiments (for example, the wireless network shown in FIG. 9). As shown, the network node 50 implements various functional means, units, or modules, e.g., via the processing circuitry 42 in FIG. 7 and/or via software code. These functional means, units, or modules, e.g., for implementing the method(s) herein, include for instance: comparing unit 52, padding unit 54, transmitting unit 56, and suppressing unit 58. Comparing unit 52 is configured to, if the DCI is of a non-fallback format 0_1 or 1_1, compare a number of bits in the DCI to a predetermined number of bits. Padding unit 44 is configured to, if the number of bits in the format 0_1 or 1_1 DCI equals the predetermined number, pad the non-fallback format 0_1 or 1_1 DCI by at least one bit. Transmitting unit 46 is configured to transmit the padded non-fallback format 0_1 or 1_1 DCI. Suppressing unit 58 is configured to, if the number of bits in the format 0_1 or 1_1 DCI equals the predetermined number and the non-fallback format 0_1 or 1_1 DCI is not padded, suppress transmission of the non-fallback format 0_1 or 1_1 DCI.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above. Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and wireless devices 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and wireless device 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960 but are enjoyed by network node 960 as a whole, and/or by end users and the wireless network generally. Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated. Interface 990 is used in the wired or wireless communication of signalling and/or data between network node 960, network 906, and/or wireless devices 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or wireless devices via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As illustrated, wireless device 910 includes antenna 911, interface 914, processing circuitry 920, device readable medium 930, user interface equipment 932, auxiliary equipment 934, power source 936 and power circuitry 937. wireless device 910 may include multiple sets of one or more of the illustrated components for different wireless technologies supported by wireless device 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within wireless device 910.

Antenna 911 may include one or more antennas or antenna arrays, configured to send and/or receive wireless signals, and is connected to interface 914. In certain alternative embodiments, antenna 911 may be separate from wireless device 910 and be connectable to wireless device 910 through an interface or port. Antenna 911, interface 914, and/or processing circuitry 920 may be configured to perform any receiving or transmitting operations described herein as being performed by a wireless device. Any information, data and/or signals may be received from a network node and/or another wireless device. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, wireless device 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or wireless devices via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 910 components, such as device readable medium 930, wireless device 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of wireless device 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a wireless device may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of wireless device 910 but are enjoyed by wireless device 910 as a whole, and/or by end users and the wireless network generally. Processing circuitry 920 may be configured to perform any determining, calculating, or similar operations (e.g., certain obtaining operations) described herein as being performed by a wireless device. These operations, as performed by processing circuitry 920, may include processing information obtained by processing circuitry 920 by, for example, converting the obtained information into other information, comparing the obtained information or converted information to information stored by wireless device 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with wireless device 910. Such interaction may be of many forms, such as visual, audial, tactile, etc. User interface equipment 932 may be operable to produce output to the user and to allow the user to provide input to wireless device 910. The type of interaction may vary depending on the type of user interface equipment 932 installed in wireless device 910. For example, if wireless device 910 is a smart phone, the interaction may be via a touch screen; if wireless device 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into wireless device 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from wireless device 910, and to allow processing circuitry 920 to output information from wireless device 910. User interface equipment 932 may include, for example, a speaker, a display, vibrating circuitry, a USB port, a headphone interface, or other output circuitry. Using one or more input and output interfaces, devices, and circuits, of user interface equipment 932, wireless device 910 may communicate with end users and/or the wireless network, and allow them to benefit from the functionality described herein.

Auxiliary equipment 934 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. wireless device 910 may further comprise power circuitry 937 for delivering power from power source 936 to the various parts of wireless device 910 which need power from power source 936 to carry out any functionality described or indicated herein. Power circuitry 937 may in certain embodiments comprise power management circuitry. Power circuitry 937 may additionally or alternatively be operable to receive power from an external power source; in which case wireless device 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of wireless device 910 to which power is supplied.

Figure 10:
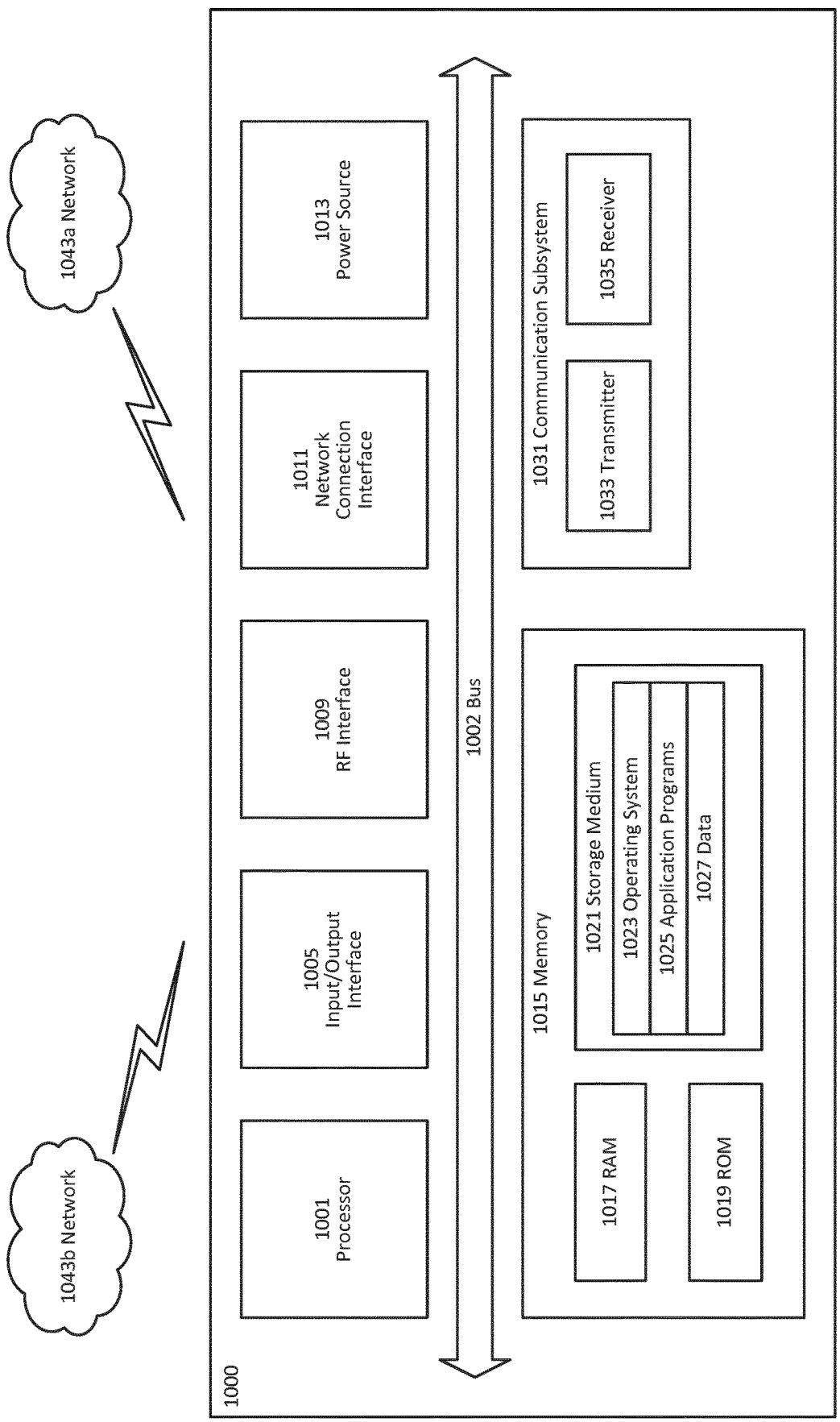
FIG. 10 illustrates one embodiment of a user equipment in accordance with various embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 10 is a UE, the components discussed herein are equally applicable to a wireless device, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above.

For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another wireless device, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
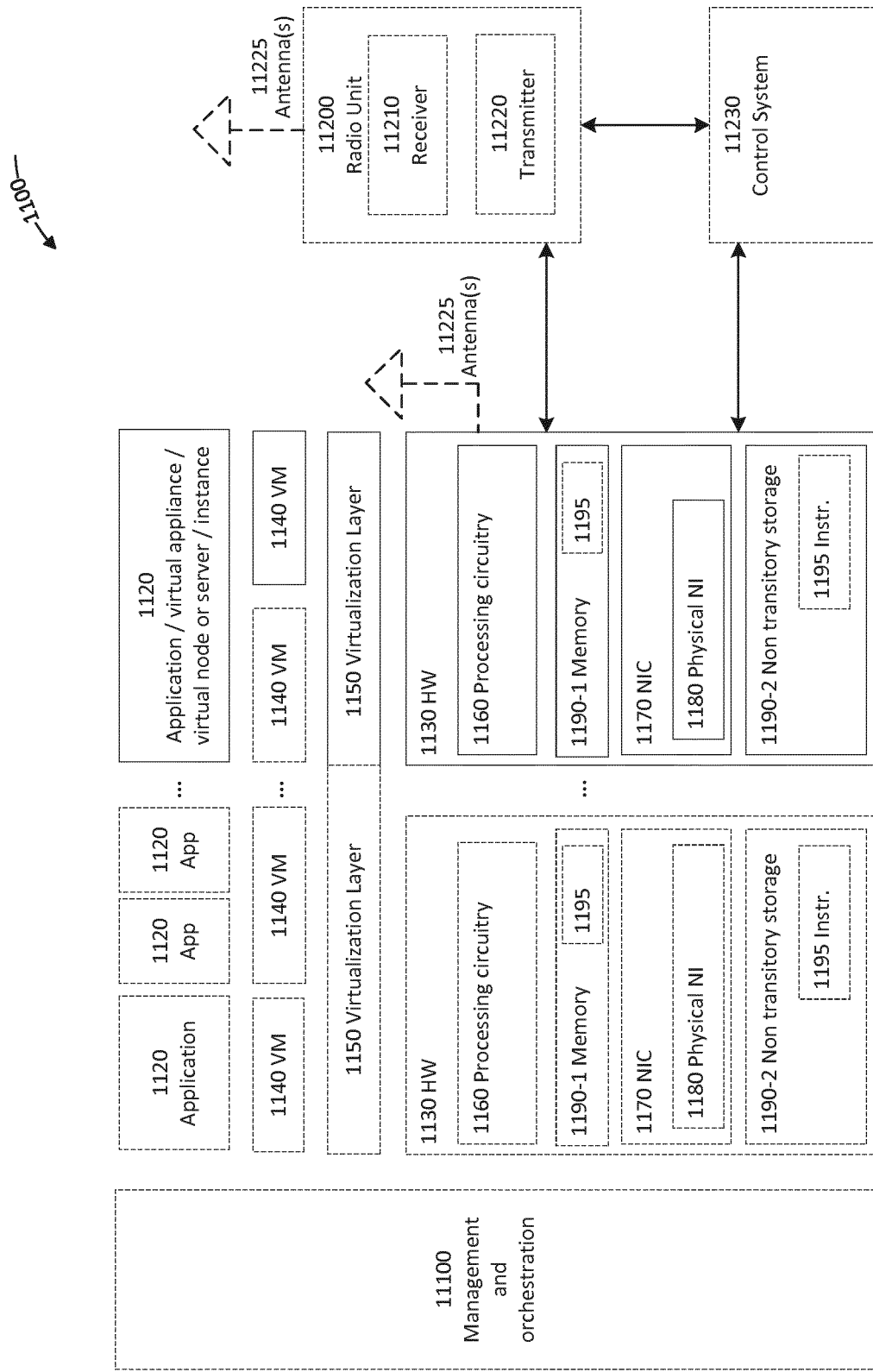
FIG. 11 is a schematic block diagram illustrating a virtualization environment according to embodiments of the present disclosure.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized. The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment. In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
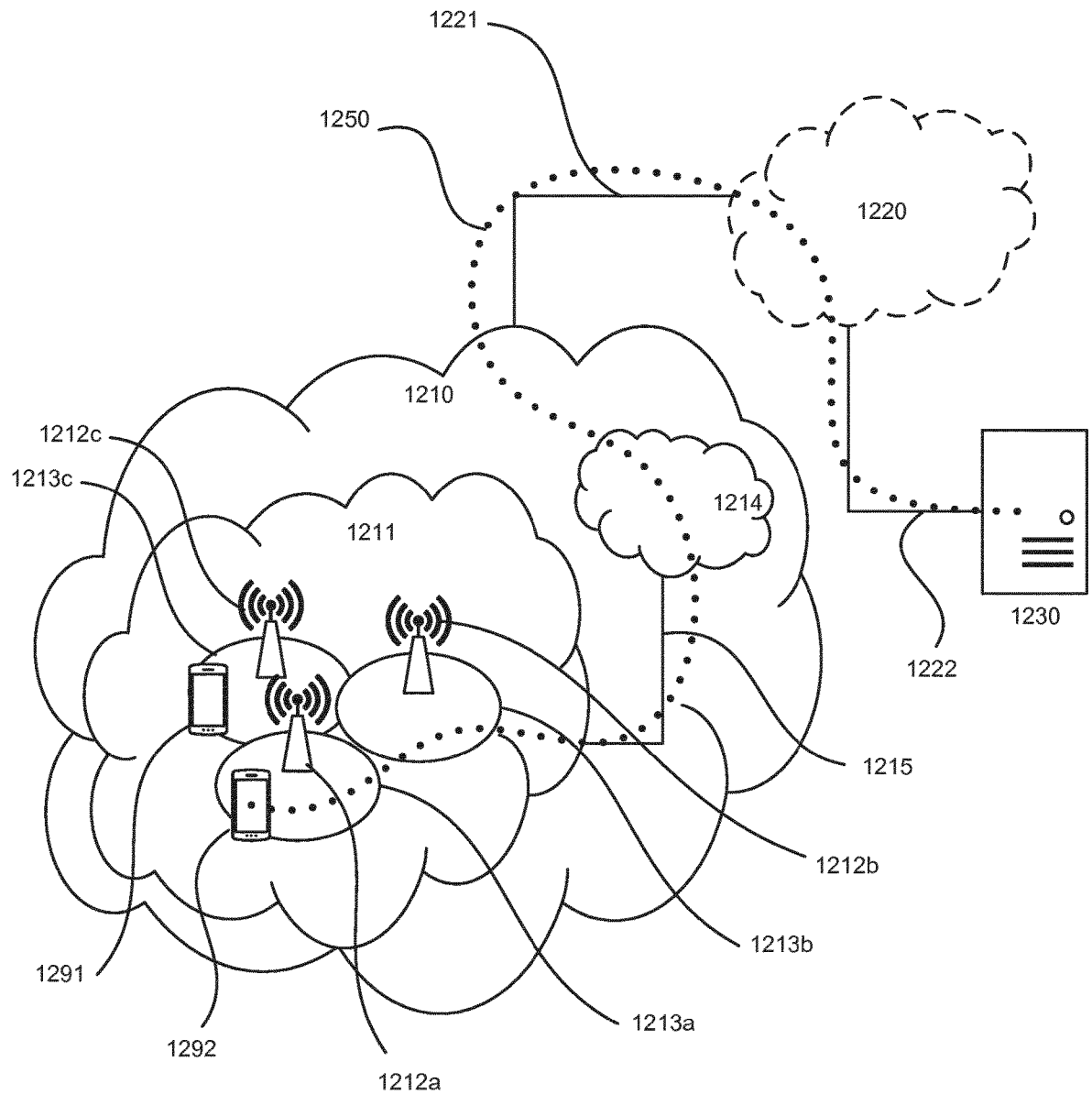
FIG. 12 illustrates a telecommunication network connected via an intermediate network to a host computer in accordance with some embodiments of the present disclosure.

FIG. 12 illustrates a telecommunication network connected via an intermediate network to a host computer in accordance with some embodiments. In particular, with reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
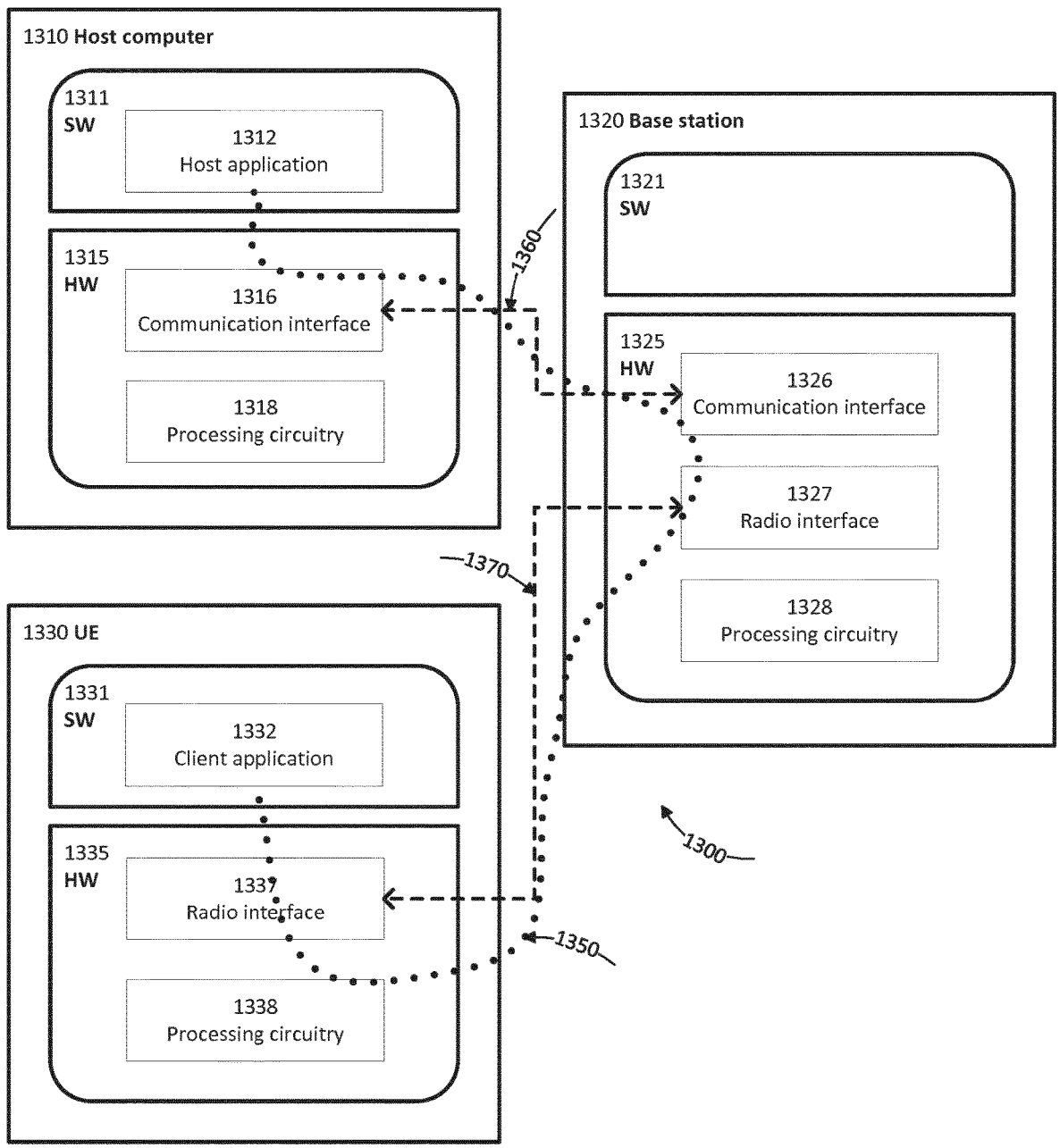
FIG. 13 illustrates a host computer communicating via a base station with a user equipment over a partially wireless connection in accordance with some embodiments of the present disclosure.

Example implementations, in accordance with an embodiment, of the UE, base station and host computer discussed in the preceding paragraphs will now be described with reference to FIG. 13. FIG. 13 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may eliminate an ambiguity in network signaling and thereby provide benefits such as improved reliability and efficiency, and avoiding wasting computational and air interface resources on error recovery.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
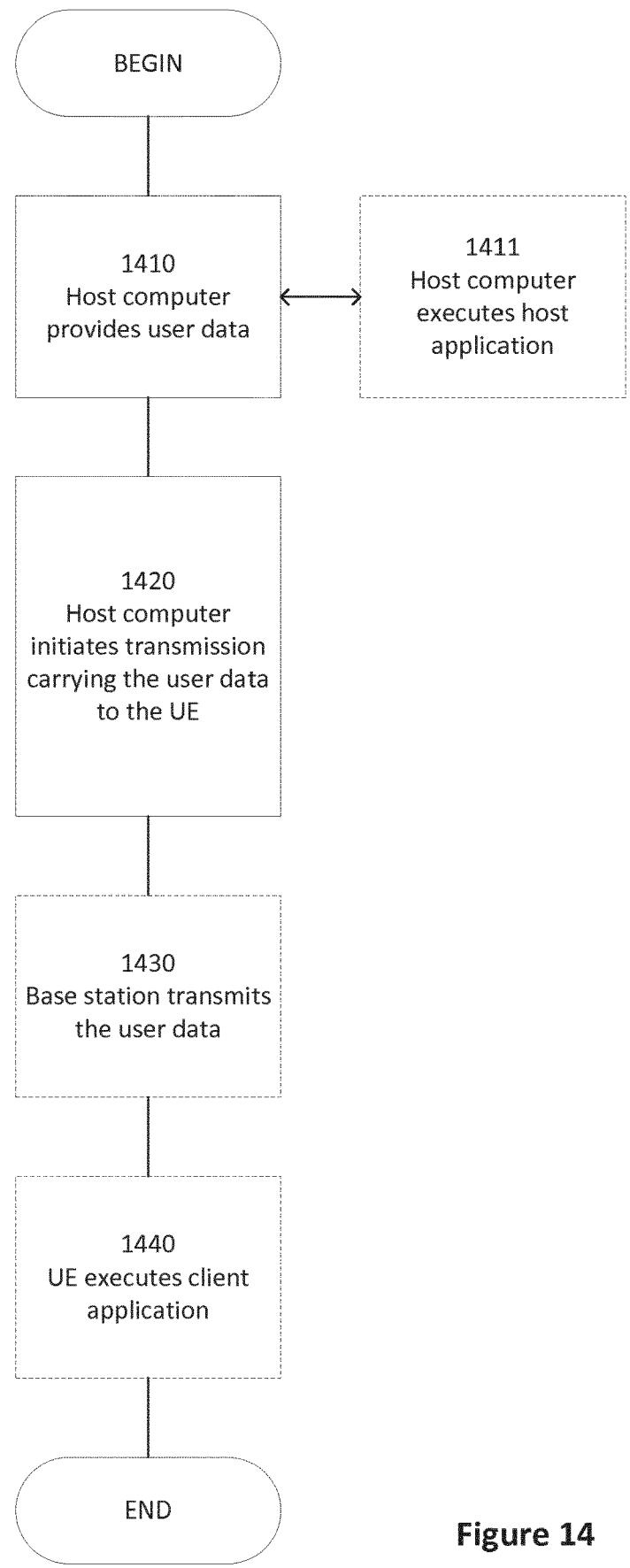
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
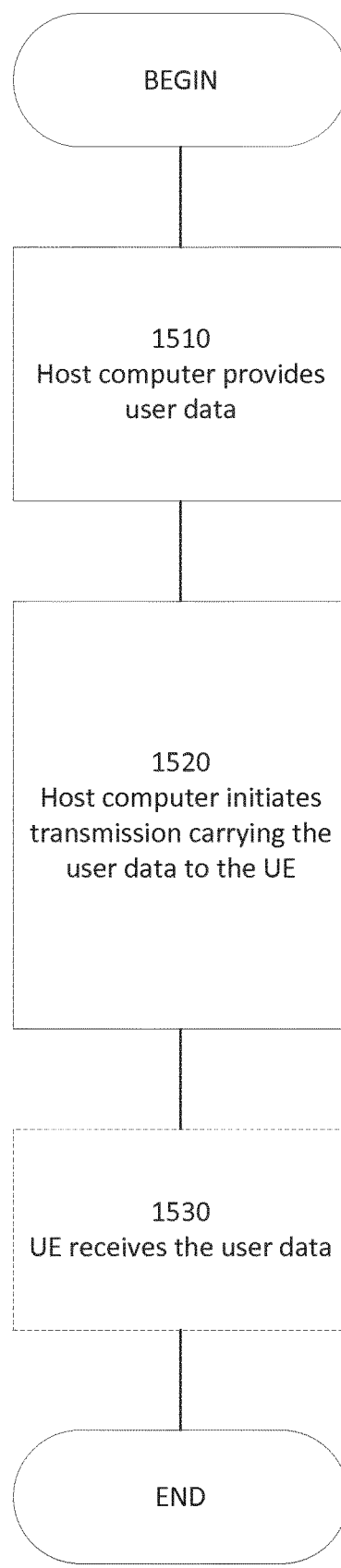
FIG. 15 is a flowchart illustrating another method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figures 16, 17:
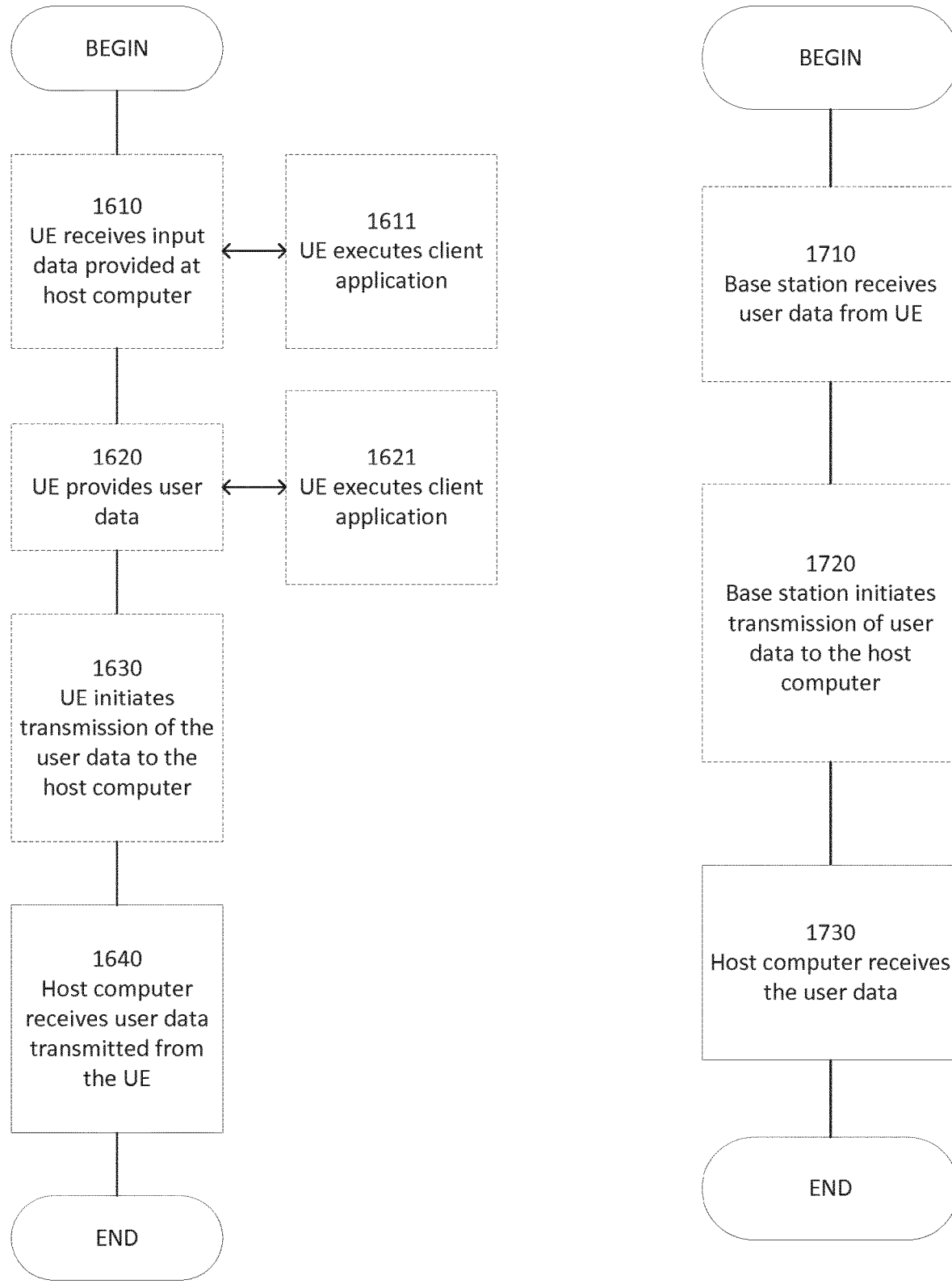
FIG. 16 is a flowchart illustrating another method implemented in a communication system, in accordance with one embodiment.
FIG. 17 is a flowchart illustrating another method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following examples are provided to further describe one or more embodiments.

Group A

1. A method, performed by a wireless device operative in a wireless communication network, for receiving Downlink Control Information (DCI) and determining a format of the DCI in response to a size of the DCI, the method comprising:

obtaining a DCI configuration for a first set of DCI formats 0_0 and 1_0, both formats having a same size measured as a number of bits;

receiving, from a base station, a DCI configuration for a second set of DCI formats 0_1 and 1_1;

calculating a size of DCI formats in the second set, according to the received configuration;

comparing the calculated size of DCI formats in the second set to the size of DCI formats in the first set;

if the sizes are different, blindly decoding a potential DCI using the size of DCI formats in the first set and the size of DCI formats in the second set; and if the sizes are equal, blindly decoding a potential DCI using the size of DCI formats in the first set and the size of DCI formats in the first set plus a predetermined increment.

2. The method of example 1 wherein the predetermined increment is one bit.

3. The method of example 1 wherein blindly decoding a potential DCI comprises blindly decoding a potential DCI in User Equipment (UE)-specific search space using predetermined Radio Network Temporary Identifiers (RNTI).

4. The method of claim 1 wherein the predetermined RNTI include Cell RNTI (C-RNTI), Configure Scheduling RNTI (CS-RNTI), and Modulation and Coding Scheme C-RNTI (MCS-C-RNTI).

5. The method of example 1 further comprising, if a DCI is successfully decoded:

determining whether the DCI is in the first or second set based on the size; and determining the DCI format within the determined set based on a format indicator bit in the DCI.

6. The method of example 1 wherein the size of a DCI as in the first set is defined in 3GPPS TS 38.212.

7. The method of example 6 wherein obtaining a DCI configuration for a first set of DCI formats 0_0 and 1_0 comprises being configured with the DCI configuration or receiving the DCI configuration via RRC signaling.

8. The method of example 1 wherein receiving, from a base station, a DCI configuration for a second set of DCI formats 0_1 and 1_1 comprises receiving the DCI configuration for a second set via RRC signaling.

9. The method of example 1 wherein the first set of DCI formats comprise fallback formats utilized if the wireless device is not configured with DCI formats in the second set; and the second set of DCI formats comprise non-fallback formats configured by the base station for specific functionality.

AA. The method of any of the previous examples, further comprising:

providing user data; and forwarding the user data to a host computer via the transmission to the base station.

Group B

10. A method, performed by a base station operative in a wireless communication network, for transmitting Downlink Control Information (DCI) to one or more wireless devices, the method comprising:

if the DCI is of a non-fallback format 0_1 or 1_1, comparing a number of bits in the DCI to a predetermined number of bits;

if the number of bits in the non-fallback format 0_1 or 1_1 DCI equals the predetermined number, performing one of:

padding the non-fallback format 0_1 or 1_1 DCI by at least one bit and transmitting the padded non-fallback format 0_1 or 1_1 DCI;

or suppressing transmission of the non-fallback format 0_1 or 1_1 DCI.

11. The base station of example 10 wherein transmitting the padded non-fallback format 0_1 or 1_1 DCI comprises:

scrambling a Cyclic Redundancy Code (CRC) in the padded non-fallback format 0_1 or 1_1 DCI using a Radio Network Temporary Identifier (RNTI) type selected from a predetermined set of RNTI types; and transmitting the padded non-fallback format 0_1 or 1_1 DCI in User Equipment (UE)-specific search space.

12. The method of claim 10 wherein the predetermined RNTI types include Cell RNTI (C-RNTI), Configure Scheduling RNTI (CS-RNTI), and Modulation and Coding Scheme C-RNTI (MCS-C-RNTI).

13. The method of example 10 wherein the predetermined number of bits is a number of bits for fallback format 0_0 or 1_0 DCI as defined in 3GPPS TS 38.212.

14. The method of any of the previous examples, further comprising:

obtaining user data; and forwarding the user data to a host computer or a wireless device.

Group C

C1. A wireless device configured to perform any of the steps of any of the Group A examples.

C2. A wireless device comprising:

processing circuitry configured to perform any of the steps of any of the Group A examples; and power supply circuitry configured to supply power to the wireless device.

C3. A wireless device comprising:

processing circuitry and memory, the memory containing instructions executable by the processing circuitry whereby the wireless device is configured to perform any of the steps of any of the Group A examples.

C4. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A examples;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C5. A computer program comprising instructions which, when executed by at least one processor of a wireless device, causes the wireless device to carry out the steps of any of the Group A examples.

C6. A carrier containing the computer program of example C5, wherein the carrier is one of an electronic signal, optical signal, radio signal, or computer readable storage medium.

C7. A base station configured to perform any of the steps of any of the Group B examples.

C8. A base station comprising:

processing circuitry configured to perform any of the steps of any of the Group B examples; power supply circuitry configured to supply power to the base station.

C9. A base station comprising:

processing circuitry and memory, the memory containing instructions executable by the processing circuitry whereby the base station is configured to perform any of the steps of any of the Group B examples.

C10. A computer program comprising instructions which, when executed by at least one processor of a base station, causes the base station to carry out the steps of any of the Group B examples.

C11. A carrier containing the computer program of example C10, wherein the carrier is one of an electronic signal, optical signal, radio signal, or computer readable storage medium.

Group D

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B examples.

D2. The communication system of the previous example further including the base station.

D3. The communication system of the previous 2 examples, further including the UE, wherein the UE is configured to communicate with the base station.

D4. The communication system of the previous 3 examples, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B examples.

D6. The method of the previous example, further comprising, at the base station, transmitting the user data.

D7. The method of the previous 2 examples, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 examples.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A examples.

D10. The communication system of the previous example, wherein the cellular network further includes a base station configured to communicate with the UE.

D11. The communication system of the previous 2 examples, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A examples.

D13. The method of the previous example, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A examples.

D15. The communication system of the previous example, further including the UE.

D16. The communication system of the previous 2 examples, further including the base station, wherein the base station comprises a radio interface configured to communicate with the UE and a communication interface configured to forward to the host computer the user data carried by a transmission from the UE to the base station.

D17. The communication system of the previous 3 examples, wherein:

the processing circuitry of the host computer is configured to execute a host application; and the UE's processing circuitry is configured to execute a client application associated with the host application, thereby providing the user data.

D18. The communication system of the previous 4 examples, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A examples.

D20. The method of the previous example, further comprising, at the UE, providing the user data to the base station.

D21. The method of the previous 2 examples, further comprising:

at the UE, executing a client application, thereby providing the user data to be transmitted; and at the host computer, executing a host application associated with the client application.

D22. The method of the previous 3 examples, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples.

D24. The communication system of the previous example further including the base station.

D25. The communication system of the previous 2 examples, further including the UE, wherein the UE is configured to communicate with the base station.

D26. The communication system of the previous 3 examples, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A examples.

D28. The method of the previous example, further comprising at the base station, receiving the user data from the UE.

D29. The method of the previous 2 examples, further comprising at the base station, initiating a transmission of the received user data to the host computer.

The invention claimed is:

1. A method, performed by a wireless device, for receiving Downlink Control Information (DCI) in User Equipment (UE) specific search spaces, the method comprising the wireless device:

receiving a DCI configuration for a first set of DCI formats, wherein each of the first set of DCI formats has a DCI of a same size measured as a number of bits;

receiving a DCI configuration for a second set of DCI formats, wherein the second set is different from the first set and has a DCI of a different size from the first set measured as a number of bits;

detecting a first DCI from the first set of DCI formats and a second DCI from the second set of DCI formats based on the first DCI having a different size to the second DCI and the second DCI comprising at least one padding bit; wherein the DCIs are monitored in multiple search spaces and the first DCI from the first set of DCI formats is detected in a first UE-specific search space and the second DCI from the second set of DCI formats is detected in a second UE-specific search space.

2. The method of claim 1:

wherein the first set of DCI formats comprises the formats "0_0" and "1_0"; and wherein the second set of DCI formats comprises the formats "0_1" and "1_1".

3. The method of claim 1:
wherein the detecting the first and the second DCI comprises blindly decoding a potential DCI using predetermined Radio Network Temporary Identifiers (RNTI);
wherein the predetermined RNTI includes a Cell RNTI (C-RNTI), a Configure Scheduling RNTI (CS-RNTI), and/or a Modulation and Coding Scheme C-RNTI (MCS-C-RNTI).

4. The method of claim 1, wherein the wireless device is not expected to handle configurations resulting in a DCI from the second set of DCI formats having the same size as a DCI from the first set of DCI formats when a scheduling direction for each of the DCI formats is the same.

5. A method, performed by a base station, for transmitting Downlink Control Information (DCI) to one or more wireless devices in User Equipment (UE) specific search spaces, the method comprising the base station:
configuring a wireless device with:
at least one DCI format from a first set of DCI formats, wherein each of the first set of DCI formats has a same size measured as a number of bits; and
at least one DCI format from a second set of DCI formats, wherein the second set is different from the first set and has a DCI of a different size from the first set measured as a number of bits;
wherein a first DCI from the first set of DCI formats has a different size to a second DCI from the second set of DCI formats, wherein the second DCI comprises at least one padding bit;
wherein the DCIs are scheduled in multiple search spaces, with the first DCI from the first set of DCI formats scheduled in a first UE-specific search space and the second DCI from the second set of DCI formats scheduled in a second UE-specific search space.

6. The method of claim 5, further comprising:
determining the first DCI for scheduling in a UE-specific search space from the first set of DCI formats;
determining the second DCI for scheduling in a UE-specific search space from the second set of DCI formats; and
in response to the determined first DCI and the determined second DCI having the same length in bits, padding the second DCI by at least one bit; and
transmitting the first DCI and the second DCI to the wireless device.

7. The method of claim 5:
wherein the first set of DCI formats comprises the formats "0_0" and "1_0"; and
wherein the second set of DCI formats comprises the formats "0_1" and "1_1".

8. The method of claim 5:
wherein the second set of DCI formats is of a non-fallback format;
further comprising comparing a number of bits in the second DCI to a predetermined number of bits, and in response to the number of bits in the second DCI equaling the predetermined number:
padding the second DCI by at least one bit and transmitting the padded second DCI; or
suppressing transmission of the second DCI.

9. The method of claim 5, wherein transmitting the first DCI and the second DCI comprises:
scrambling a Cyclic Redundancy Code (CRC) using a Radio Network Temporary Identifier (RNTI) type selected from a predetermined set of RNTI types;
wherein the predetermined RNTI types include a Cell RNTI (C-RNTI), a Configure Scheduling RNTI (CS-RNTI), and a Modulation and Coding Scheme C-RNTI (MCS-C-RNTI).

10. A wireless device for receiving Downlink Control Information (DCI) in User Equipment (UE) specific search spaces, the wireless device comprising:
processing circuitry;
memory containing instructions executable by the processing circuitry whereby the wireless device is operative to:
receive a DCI configuration for a first set of DCI formats, wherein each of the first set of DCI formats has a DCI of a same size measured as a number of bits;
receive a DCI configuration for a second set of DCI formats, wherein the second set is different from the first set and has a DCI of a different size from the first set measured as a number of bits;
detect a first DCI from the first set of DCI formats and a second DCI from the second set of DCI formats based on the first DCI having a different size to the second DCI and the second DCI comprising at least one padding bit; wherein the DCIs are monitored in multiple search spaces and the first DCI from the first set of DCI formats is detected in a first UE-specific search space and the second DCI from the second set of DCI formats is detected in a second UE-specific search space.

11. The wireless device of claim 10:
wherein the first set of DCI formats comprises the formats "0_0" and "1_0"; and
wherein the second set of DCI formats comprises the formats "0_1" and "1_1".

12. The wireless device of claim 10:
wherein the instructions are such that the wireless device is operative to detect the first DCI and the second DCI by blindly decoding a potential DCI using predetermined Radio Network Temporary Identifiers (RNTI);
wherein the predetermined RNTI includes a Cell RNTI (C-RNTI), a Configure Scheduling RNTI (CS-RNTI), and/or a Modulation and Coding Scheme C-RNTI (MCS-C-RNTI).

13. The wireless device of claim 10, wherein the instructions are such that the wireless device is operative to:
determine whether a received DCI is in the first or second set based on the size; and
determine a DCI format within the determined set based on a format indicator bit in the received DCI.

14. The wireless device of claim 10, wherein the instructions are such that the wireless device is not expected to handle configurations resulting in a DCI from the second set of DCI formats having the same size as a DCI from the first set of DCI formats when a scheduling direction for each of the DCI formats is the same.

15. The wireless device of claim 10, wherein the wireless device is a UE.

16. A base station for transmitting Downlink Control Information (DCI) to one or more wireless devices in User Equipment (UE) specific search spaces, the base station comprising:
processing circuitry;
memory containing instructions executable by the processing circuitry whereby the device is operative to:
configure a wireless device with:

at least one DCI format from a first set of DCI formats, wherein each of the first set of DCI formats has a same size measured as a number of bits; and at least one DCI format from a second set of DCI formats, wherein the second set is different from the first set and has a DCI of a different size from the first set measured as a number of bits;

wherein a first DCI from the first set of DCI formats has a different size to a second DCI from the second set of DCI formats, wherein the second DCI comprises at least one padding bit;

schedule the first DCI and the second DCI in multiple search spaces, with the first DCI from the first set of DCI formats scheduled in a first UE-specific search space and the second DCI from the second set of DCI formats scheduled in a second UE-specific search space.

17. The base station of claim 16, wherein the instructions are such that the base station is operative to:

determine a first DCI for scheduling in a UE-specific search space from the first set of DCI formats;

determine a second DCI for scheduling in a UE-specific search space from the second set of DCI formats;

in response to the determined first DCI and the determined second DCI having the same length in bits, pad the second DCI by at least one bit; and transmitting the first DCI and the second DCI to the wireless device.

18. The base station of claim 16:

wherein the second set of DCI formats is of a non-fallback format;

wherein the instructions are such that the base station is operative to:

compare a number of bits in the second DCI to a predetermined number of bits; and in response to the number of bits in the second DCI equaling the predetermined number:

pad the second DCI by at least one bit and transmitting the padded second DCI; or suppress transmission of the second DCI.

19. The base station of claim 16:

wherein the transmitting the first DCI and the second DCI comprises scrambling a Cyclic Redundancy Code (CRC) using a Radio Network Temporary Identifier (RNTI) type selected from a predetermined set of RNTI types;

wherein the predetermined RNTI types include a Cell RNTI (C-RNTI), a Configure Scheduling RNTI (CS-RNTI), and a Modulation and Coding Scheme C-RNTI (MCS-C-RNTI).

\* \* \* \* \*